E. W. CLARK.
BORING TOOL.
APPLICATION FILED DEC. 19, 1914.
1,281,519.
Patented Oct. 15, 1918.
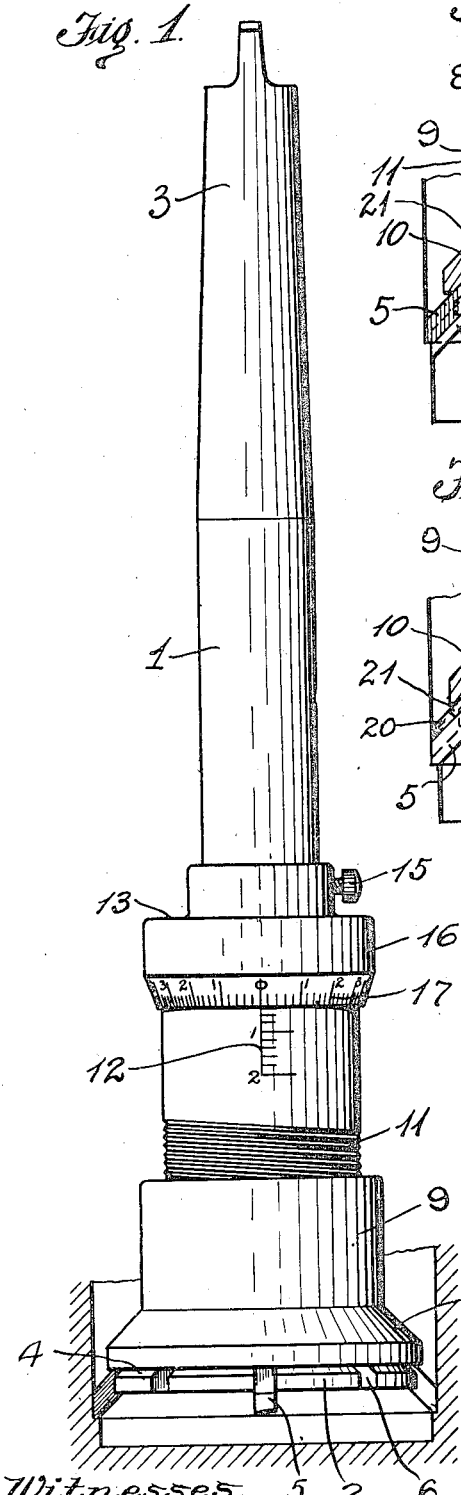
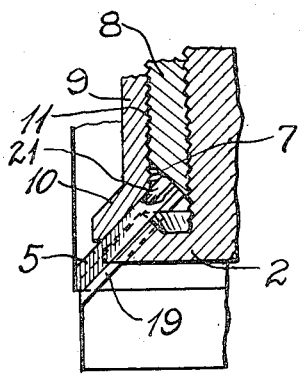
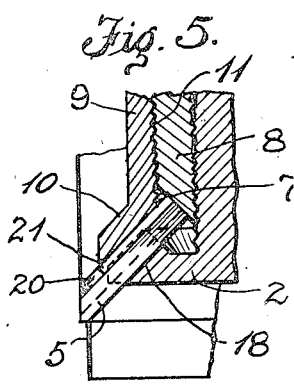
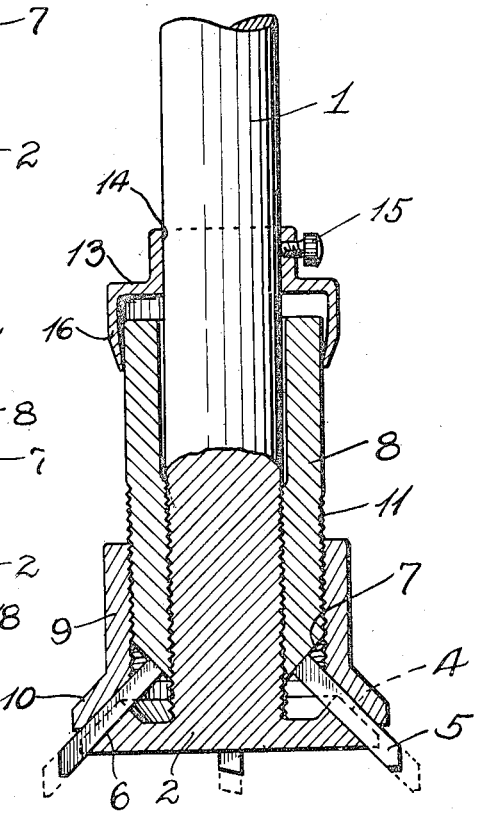
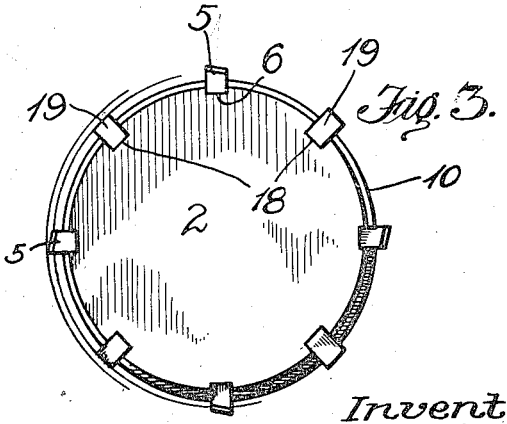
Inventor.
Edward W. Clark.
Witnesses.
E. R. Pollard
Mattie Sinclair.
By Cassell Severance
Atty.

UNITED STATES PATENT OFFICE.

EDWARD W. CLARK, OF LOS ANGELES, CALIFORNIA, ASSIGNOR OF ONE-HALF TO ALVIN WELLS, OF LOS ANGELES, CALIFORNIA.

BORING-TOOL.

1,281,519.  Specification of Letters Patent.  Patented Oct. 15, 1918.

Application filed December 19, 1914. Serial No. 878,050.

*To all whom it may concern:*

Be it known that I, EDWARD W. CLARK, a citizen of the United States, residing at Los Angeles, in the county of Los Angeles and State of California, have invented certain new and useful Improvements in Boring-Tools, of which the following is a specification.

This invention relates to improvements in boring tools or implements and particularly to that class of boring devices that are adapted to bore or ream out the interior of devices such as cylinders or other devices or articles where a smooth and true inner surface is required.

It is an object of the invention to provide a boring tool capable of using a plurality of cutters simultaneously, an adjustable scale device being provided for accurately setting all of the cutters for producing the cut or bore desired.

It is also an object of the invention to provide a boring tool with a plurality of inclined diverging cutters and with means for adjusting said cutters to enlarge the cut made, said means being adjustable upon the shank of the tool.

It is a further object of the invention to provide a boring tool with a plurality of cutters, a micrometer device being also provided for accurately adjusting and setting the said cutters.

It is a still further object of the invention to provide a boring tool in which the cutters may be set at such an angle as to extend into the corners of a bore which is closed at its inner end.

It is also a further object of the invention to provide a boring tool in which a plurality to provide a boring tool in which a plurality of diverging cutters are used, and in which intermediate spacing or guide pieces are employed for preventing the cutters and the boring tool carrying the same from being sprung out of true by operating upon material portions of which are harder than other portions thereof.

In the accompanying drawing forming a part of this specification:

Figure 1 is a side elevation of a boring tool constructed in accordance with the present invention, the walls of an article being bored thereby, being shown in section.

Fig. 2 is a central longitudinal sectional view through the said boring tool, a portion of the shank thereof being shown in side elevation, and a portion of said shank being also broken away.

Fig. 3 is an end elevation of the said boring tool, looking at the end thereof which carries the cutters.

Fig. 4 is a fragmentary detail sectional view through the edge portion of the head of the tool showing a cutter and a pilot piece in advance thereof.

Fig. 5 is a similar sectional view but showing a pilot piece following a cutter.

The device of the present invention is of such a character that a plurality of cutters may be employed upon a single boring tool or implement, the said tool being provided with an adjusting member adapted to set or adjust all of the cutters simultaneously and equally for causing each cutter to cut and remove an equal amount of material from the bore being produced. The details and features of the invention will now be more specifically described with reference to the accompanying drawing in which 1 indicates a shank or stem having a head 2 at one end thereof and a chuck engaging tapered portion 3 at the other end thereof.

The head 2 is provided with a beveled peripheral edge 4 made of suitable width to offer a proper support to the cutters 5 which are carried thereby. The beveled surface is preferably approximately at an angle of about 45 degrees with respect to the shank 1, though it should be understood that it may be at a greater or less angle thereto if desired. At suitable intervals upon said beveled edge 4, sockets or recesses 6 are formed to receive the cutters 5. There are a plurality of such recesses and generally a sufficient number to receive say, from four to eight cutters as desired.

The cutters are suitably shaped at their outer ends to cut the metal from the surface of the article to be bored, while their inner ends are preferably cut square across so as to fit against the beveled end 7 of an adjusting member or sleeve 8. The portion of the shank 1 back of the head 2 is provided with suitable screw threads for a short distance and the sleeve 8 is also provided upon its inner surface with corresponding threads, so that the said sleeve may be adjusted toward or away from the head 2. The head 2 is preferably reduced in thickness inside the beveled edges 4 to permit the beveled edge or end 7 of the sleeve to have a sufficient range of movement with respect to the cutters to permit of any desired adjustment thereof.

To properly hold the cutters in their sockets or recesses 6, an exterior clamping ring 9 is provided having an outwardly flared portion or flange 10 adapted to engage the cutters and grip them tightly in their recesses, after they have been adjusted. The said clamping ring 9 is provided with interior screw threads adapted to engage corresponding threads 11 formed upon a portion of the said sleeve 8, all as clearly shown in Figs. 1 and 2 of the drawing.

To assist in fine adjustments of the cutters the device is provided with a micrometer mechanism, the sleeve 8 acting as a micrometer screw and being provided with scale indications at 12 extending longitudinally of the said sleeve. Coöperating with the sleeve 8 is a micrometer ring 13 having an opening at 14 closely fitting upon the stem 1 and a set screw or other suitable means for clamping the ring tightly upon said stem 1. The ring 13 has a flange 16 overhanging and telescoping upon the adjacent end of the sleeve 8, said flange being provided with an annular beveled surface carrying a scale 17 for coöperating with the scale 12, in the manner usual with micrometer devices. By means of this micrometer mechanism the sleeve 8 may be accurately set for moving the cutters 5 outwardly to just the degree desired for producing the required bore.

In use the cutters 5 are all made the same length, their cutting points being ground so as to give the proper clearance during the cutting operation. The cutters are then placed in the sockets 6 and by turning the sleeve 8 with respect to the micrometer ring 13 the cutters may be adjusted accurately according to the micrometer scales so as to remove the required amount of material from the surface of the article, to produce a bore of the desired size. After thus properly adjusting the cutters by the manipulation of the sleeve 8, the clamp ring 9 is tightened upon the cutters to hold them firmly in adjusted position.

The tool is of course employed in connection with a drill press or other mechanism, that will properly rotate the same and which is provided with a mechanism for feeding the tool forward in the bore. I find in practice that a plurality of cutters, usually about four, thus operating in a bore, each do a small portion of the work, producing a very smooth and even result, and without the tendency of springing any of the cutters out of place or out of desired alinement as the work progresses. By providing the cutter head 2 with a plurality of recesses 6, it will be seen that any desired number of cutters may be employed.

In many instances it is desirable to employ pilot means in insuring a proper direction in the movement of the boring tool and for this reason the cutter head 2 is provided with intermediate sockets or recesses 18 in which pilot bars or pieces 19 may be set. The said pilot pieces 19 as shown in Fig. 4 of the drawing will thus be a little in advance of the cutters in moving through the bore of the cylinder or other article and will engage the inner surface of said article in such a way as to properly pilot or direct the boring tool as the boring operation progresses.

If desired the pilot means employed may be caused to follow the cutters instead of leading them. Thus as shown in Fig. 5 the cutters 5 are set in the deeper sockets or recesses 18 and pilot pieces or bars 20 are placed in the shallower recesses 6. The said pilot pieces or bars 20 will thus have to be made a trifle shorter than the cutters so as to move upon the surface of the bore after it has been acted upon by the said cutters, all as will be evident from an examination of said Fig. 5. The action of the pilot pieces whether leading or following the cutters is practically the same in that the tool is properly held in place. When cutting or reaming a bore that is closed at one end as indicated in Fig. 1, the pilot pieces or bars should follow the cutters and not lead them. The use of such pilot pieces or bars is especially valuable where the metal bored has portions which are harder than others and prevent the cutters and drill tool from being sprung out of position or true alinement when they encounter said harder portions. When the pilots or the cutters are set in the deeper sockets 18 it is necessary to insert liners 21 to fill the spaces between them and the flange 4 of the clamping ring 9 whereby the said clamping ring will bear upon and hold in place all of the said cutters and pilots.

It will be understood that the adjustment of the sleeve 8 toward the head 2 will move the cutters and also the pilot pieces when employed, outwardly in their sockets for giving the proper diameter to the bore to be produced, and also to compensate for any shortening of the cutters by reason of their being ground or sharpened from time to time. The pilots are of course shortened in accordance with the length of the cutters after the cutters are ground. The micrometer mechanism aids materially in quickly adjusting the cutters to a very fine degree. Of course it will be understood that the minor details of construction may be somewhat altered within the scope of the appended claims, and that the angle at which the cutters are held may be different in different tools. So also the number of sockets provided for cutters or pilot pieces may be increased or diminished as desired all within the scope of the said claims.

What is claimed is:

1. A boring tool comprising a stem having an enlarged head thereon, a plurality of cutters slidably held on said head and radiating therefrom in diagonal planes, an adjustable sleeve for said cutters adjustable relative to said stem, and a clamping member adjustable relative to said sleeve for holding said cutters in operating position.

2. A boring tool comprising a stem having an enlarged head thereon, cutters extensibly carried thereby, an adjustable sleeve on said stem for engagement with and fixing the positions of said cutters, a clamping ring adjustable on said sleeve for engagement with the cutters and micrometer means on said stem and said sleeve for setting said cutters.

3. A boring tool comprising a head having a plurality of radiating and tapering seats formed therein, a stem on said head, cutters slidably held in said seats, a sleeve adjustable on said stem and engaging all of said cutters, and means adjustable on said sleeve for holding said cutters in position.

4. A boring tool having a flaring cutter spreading head, cutters carried thereby and an adjustable member carried by the tool and having a beveled edge approximately at right angles to the said cutters for bearing against the inner ends of the cutters to adjust them on said flaring head and hold them evenly with respect to the bore to be cut, and a clamp sleeve bearing on said cutters to hold them in adjusted positions.

5. A boring tool having a head portion formed with a stem, and a beveled periphery with cutter carrying sockets in the beveled surface thereof, cutters in said sockets, an adjusting sleeve carried by said stem and adapted to bear upon the inner end of cutters, and a clamping sleeve carried by the cutter adjusting sleeve, said cutters adapted to be gripped between the said head and the said clamping sleeve.

6. A boring tool having a head adapted to carry divergent cutters, a sleeve having a beveled edge for engaging the inner ends of the cutters, cutters carried by said head and engaging said sleeve, a clamping ring for pressing the cutters against said head, the sleeve having one scale of a micrometer device formed thereon, and a micrometer ring adjustably secured to the tool and coöperating with the scale on the sleeve for facilitating accurate adjustments of the cutters.

7. A boring tool having radiating cutters mounted thereon, a micrometer screw adapted to be forced between the cutters for spreading them and a micrometer ring having a telescoping flange within which the sleeve operates for accurately setting the cutters.

8. A boring tool having a head provided with sockets of different depths, cutters mounted in all the sockets of one depth and pilot pieces mounted in the sockets of another depth for guiding the cutters in operation, and means for clamping the cutters and pilot pieces in place.

9. A boring tool having a head provided with a plurality of sockets some of which are deeper than others, cutters mounted in the sockets of one depth, pilot pieces mounted in the sockets of another depth, an adjusting member engaging the ends of said cutters and pilot pieces and a clamping member for gripping the said cutters and pilot pieces for holding them in adjusted position.

10. A boring tool comprising an integral stem and head, provided with outwardly tapering and radiating cutter seats, cutters extensibly held in said seats, a sleeve on said stem for engagement with the inner ends of said cutters, and a ring on said sleeve for engagement with the sides of said cutters, said sleeve and ring being adjustable relative to said stem, for adjusting the positions of the cutters.

11. A boring tool comprising a stem with a head thereon provided with a plurality of tapered cutter sockets, cutters in said sockets, a sleeve adjustably held on said stem and having an end portion engaging all of said cutters, a relatively adjustable clamping member for engagement with said cutters and a micrometer carried by said stem for accurately setting the cutters.

In testimony whereof, I have hereunto set my hand, in presence of two witnesses.

EDWARD W. CLARK.

Witnesses:
 CASSELL SEVERANCE,
 EARLE R. POLLARD.